United States Patent
Ho et al.

(10) Patent No.: US 7,823,836 B2
(45) Date of Patent: Nov. 2, 2010

(54) OPTIMAL SUN SAFE ATTITUDE FOR SATELLITE GROUND TRACKING

(75) Inventors: Yiu-Hung M. Ho, Palos Verdes Estates, CA (US); John Y. Liu, San Marino, CA (US)

(73) Assignee: The Boeing Company, Chicago, IL (US)

( * ) Notice: Subject to any disclaimer, the term of this patent is extended or adjusted under 35 U.S.C. 154(b) by 789 days.

(21) Appl. No.: 11/633,268

(22) Filed: Dec. 4, 2006

(65) Prior Publication Data

US 2008/0128559 A1    Jun. 5, 2008

(51) Int. Cl.
- *B64G 1/24* (2006.01)
- *F02K 1/00* (2006.01)
- *F02K 3/00* (2006.01)
- *F02K 5/00* (2006.01)
- *F02K 7/00* (2006.01)
- *F02K 9/00* (2006.01)
- *F03H 1/00* (2006.01)
- *F03H 3/00* (2006.01)

(52) U.S. Cl. .................... 244/164; 244/158.6

(58) Field of Classification Search ............... 244/164, 244/165, 169, 158.6; 701/13, 226
See application file for complete search history.

(56) References Cited

U.S. PATENT DOCUMENTS

| | | | | | |
|---|---|---|---|---|---|
| 4,318,517 | A | * | 3/1982 | Salkeld et al. | 244/158.2 |
| 4,728,061 | A | * | 3/1988 | Johnson et al. | 244/164 |
| 4,949,922 | A | * | 8/1990 | Rosen | 244/168 |
| 5,149,022 | A | * | 9/1992 | Flament | 244/168 |
| 5,556,058 | A | * | 9/1996 | Bender | 244/171 |
| 6,017,001 | A | * | 1/2000 | Lambeaux et al. | 244/169 |
| 2005/0103941 | A1 | * | 5/2005 | Ebert et al. | 244/164 |

* cited by examiner

*Primary Examiner*—Timothy D Collins
*Assistant Examiner*—Philip J Bonzell
(74) *Attorney, Agent, or Firm*—Gates & Cooper LLP

(57) ABSTRACT

A method and apparatus for maneuvering a satellite in orbit to alternately optimize the collection of solar energy and to take sensor data of terrestrial objects is disclosed The longitudinal axis of a large payload package is oriented perpendicular to the orbital plane to minimize the disturbance torque due to gravity gradient, and to allow simple rotation about the axis for attitude change between optimal Sun and optimal ground coverage.

15 Claims, 7 Drawing Sheets

OPTIMAL SUN SAFE ATTITUDE FOR SATELLITE GROUND TRACKING

BACKGROUND OF THE INVENTION

1. Field of the Invention

The present invention relates generally to systems and methods for maneuvering satellites in orbit, and in particular, to a system and method for maneuvering a satellite to direct a one sensors at terrestrially based locations and for optimal collection of solar energy.

2. Description of the Related Art

Satellites typically comprise solar panels that are used to collect solar energy. The solar energy capabilities of such panes are maximized if the panes face directly into the Sun (that is, a vector normal to the plane of the solar panes is directed at the Sun). While solar panels are typically capable of rotating along one axis, the satellite itself usually also needs to be oriented to absorb maximum energy from the Sun.

In most circumstances, this poses no significant problems, as the moment of inertia of the satellite is small enough to permit such satellite orientations without undue requirements placed upon the satellite's attitude control subsystems. However, some satellite missions demand the use of sensor packages that substantially increase the satellite's moment of inertia about at least one of the satellite's axes. For example, sensor arrays used for space-based ground surveillance using radar can be quite large compared to other satellite structures, substantially increasing the satellite's moment of inertia. Such arrays may also be fixed to the satellite bus itself, thereby requiting the satellite bus to rotate to direct the arrays at the desired terrestrial location. As a result, such satellites can be asked to perform frequent and large rotations about axes with large moments of inertia. This places costly requirements on the satellite attitude control system, particularly the motive elements (e.g. thrusters, momentum wheels and the like) that are used to rotate the satellite.

What is needed is a system and method that permits satellites with large or extended payloads to achieve their mission while still permitting maximum solar energy absorption without the use of high capacity motive elements. The present invention satisfies this need.

SUMMARY OF THE INVENTION

To address the requirements described above, the present invention discloses a method and apparatus for maneuvering a satellite in orbit to alternately optimize the collection of solar energy and to take sensor data of terrestrial objects. The satellite has a payload such as a sensor disposed longitudinally along a first (x) axis and rotatable solar panels disposed longitudinally along a second (y) axis perpendicular to the first axis (x), the satellite having a moment of inertia about the first axis $I_{XX}$ and about the second axis $I_{YY}$ and a moment of inertia $I_{ZZ}$ about a third (z) axis perpendicular to the first axis (x) and the second (y) axis such that $I_{XX}<I_{YY}$ and $I_{XX}<I_{ZZ}$. When the satellite is not in a payload data collection mode, the satellite is oriented to align the first (x) axis normal to the plane of the orbit and rotated about the first (x) axis such that the second (y) axis is perpendicular to a Sun line of sight. The satellite's solar panels are also rotated about the second (y) axis at a first angle (θ) from the satellite orbital plane to orient the solar panels towards the Sun. The alignment of the first (x) axis is maintained normal to the satellite orbital plane during the non-payload data collection mode. When the satellite is in a payload data collection mode, the satellite is rotated about only the first (x) axis to direct the payload at a terrestrial target; and target-related payload data is collected.

The apparatus comprises a plurality of attitude motive elements, the plurality of attitude motive elements for changing the attitude of the satellite in the first (x) axis, the second (y) axis, and the third (z) axis and one or more processors, communicatively coupled to the attitude motive elements. The processor may be communicatively coupled to a memory storing instructions comprising instructions for maneuvering the satellite to a first orientation by orienting the satellite to align the first (x) axis normal to the plane of the orbit, rotating the satellite about the first (x) axis such that the second (y) axis is perpendicular to a Sun line of sight, and rotating the solar panels about the second (y) axis at a first angle (θ) from the satellite orbital plane to orient the solar panels towards the Sun, and maintaining the alignment of the first (x) axis normal to the satellite orbital plane during the non-payload data collection mode when the satellite is not in a payload data collection mode. The memory may also store instructions for maneuvering the satellite to a second orientation by rotating the satellite only about the first (x) axis to direct the payload at a terrestrial target and to collect the payload data when the satellite is in a payload data collection mode.

For the most satellites with global surveillance mission (including those in low-earth or mid-earth orbits), the motion of the Sun and the precession of the satellite's orbital plane are slow compared to their relative motion to the ground. Therefore, once the attitude of the satellite for optimal solar power is set, it will require very little or no adjustment over a small number of orbit revolutions. In typical daily operations, the spacecraft will be in the Sun optimal attitude most of the time. The attitude may then be changed only to allow optimal payload sensor coverage when the satellite is near the ground area of interest.

The design described herein places the rotation axis of the solar panel on the y axis of the bus, and the payload sensor array along the x axis of the bus. Due to the length of the array support structure and the corresponding mass property of the system, the bus x axis is the principal axis with minimum moment of inertia. This design places the x-axis perpendicular to the orbital plane to minimize the disturbance torque due to gravity gradient, and to allow simple rotation about the X-axis for attitude change between optimal Sun and optimal ground coverage. Small rotations at constant rate about an inertial reference can be introduced to accommodate the precession of the orbital plane due to natural perturbation.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
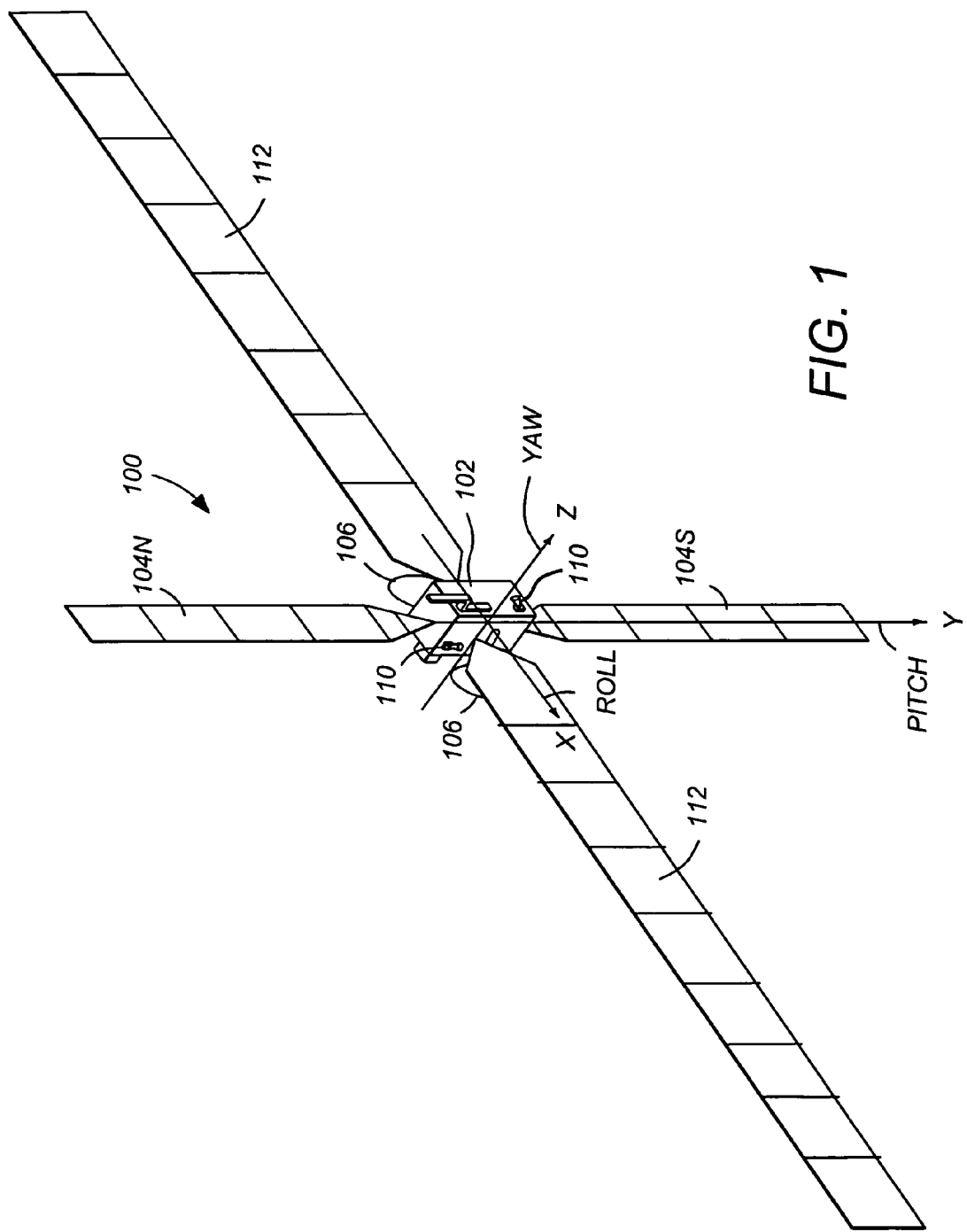
FIG. 1 is a diagram of a representative satellite having a large payload array.

FIG. 1 illustrates a three-axis stabilized satellite or spacecraft 100. The spacecraft 100 is preferably situated in a stationary orbit about the Earth. The satellite 100 has a main body 102, a pair of solar panels 104, a pair of high gain narrow beam antennas 106, and a telemetry and command omnidirectional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively. In the illustrated embodiment, the solar panels 104 can be rotated along their longitudinal axis (the y axis) to direct them at the Sun. Other embodiments may include solar panels that are also rotatable about the z and y axes, but such implementations are more expensive, and in light of the invention described below, unnecessary for purposes of maximizing solar power collection.

The three axes of the spacecraft 10 are shown in FIG. 1. The pitch axis P lies along the plane of the solar panels 140N and 140S. The roll axis R and yaw axis Y are perpendicular to the pitch axis P and lie in the directions and planes shown.

The satellite 100 also comprises a payload such as a sensor system having a sensor array 112. In the illustrated embodiment, the sensor array 112 implements a space-based radar system used to view targets on the Earth. The sensor array 112 could be coupled to the satellite bus 102 via one or more joints and motors that would permit the sensor array 112 to be rotated along it's longitudinal (x) axis to view the Earth, or may be fixedly coupled to the satellite bus 102 so that any reorientation of the sensor array 112 requires that the satellite bus be reoriented as well. In the illustrated embodiment, the z axis is perpendicular to the sensor array.

Accordingly, in the illustrated embodiment, the satellite has a sensor array 112 disposed longitudinally along the x axis and rotatable solar panels 104 disposed longitudinally along a second y axis perpendicular to the x axis. The satellite 100 has a moment of inertia $I_{xx}$ about the x axis, a moment of inertia $I_{yy}$ about the y axis and a moment of inertia $I_{zz}$ about the z axis perpendicular to the first axis (x) and the second (y) axis. Also in the illustrated embodiment, the mass distribution of the satellite 100 is such that the moment of inertia about the x axis is less than the moment of inertia of either the y or z axes (e.g., $I_{xx} < I_{yy}$ and $I_{xx} < I_{zz}$).

Due to the length and corresponding mass properties of the sensor array 112 and support structure the x axis is the axis with the minimum moment of inertia. As described below, this invention advantageously places the x axis perpendicular to the orbital plane 402. This results in two important benefits. First, it minimizes disturbance torques due to gravity gradients and second, it allows the satellite to change modes from solar collection to data collection and back again through a simple rotation about only the x axis.

Figure 2:
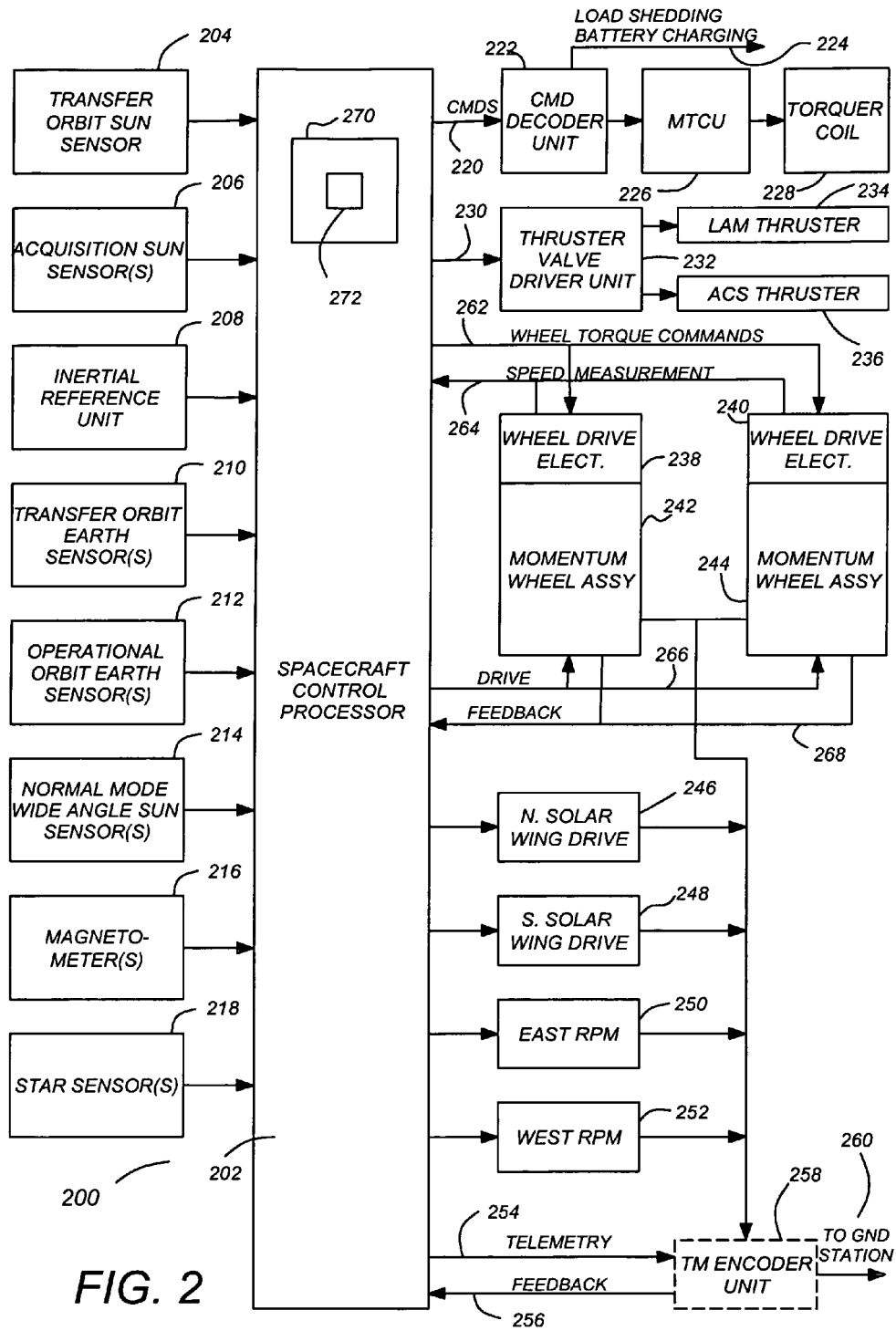
FIG. 2 is a block diagram illustrating a satellite attitude control system.

FIG. 2 is a diagram depicting the functional architecture of a representative attitude control system 200. Control of the satellite 100 is provided by a computer or spacecraft control processor (SCP) 202. The SCP 202 performs a number of functions which may include post ejection sequencing, transfer orbit processing, acquisition control, stationkeeping control, normal mode control, mechanisms control, fault protection, and spacecraft systems support, among others. The post ejection sequencing could include initializing to assent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanisms mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

The attitude control system comprises a plurality of attitude motive elements or actuators that are used to change the attitude of the satellite in the first (x) axis, the second (y) axis, and the third (z) axis. Such elements include ACS thrusters 236 and momentum wheels 242 and 244 of a number and orientation to permit the satellite 100 to be rotated about any one or all of the x, y, and z axes. Other attitude control actuators may also be used.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor also sends jackscrew drive signals 266 to the momentum wheel assemblies 243 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260.

The spacecraft control processor also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

Other spacecraft employing external torquers, chemical or electric thrusters, magnetic torquers, solar pressure, etc. cannot be inverted without changing the control or reversing the wheel spin direction. This includes momentum bias spacecraft that attempt to maintain the spacecraft body fixed and steer payload elements with payload gimbals.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 10 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 10 or on the ground), thereby making a computer program product or article of manufacture according to the invention. As such, the terms "program storage device," "article of manufacture" and "computer program product" as used herein are intended to encompass a computer program accessible from any computer readable device or media.

Figure 3:
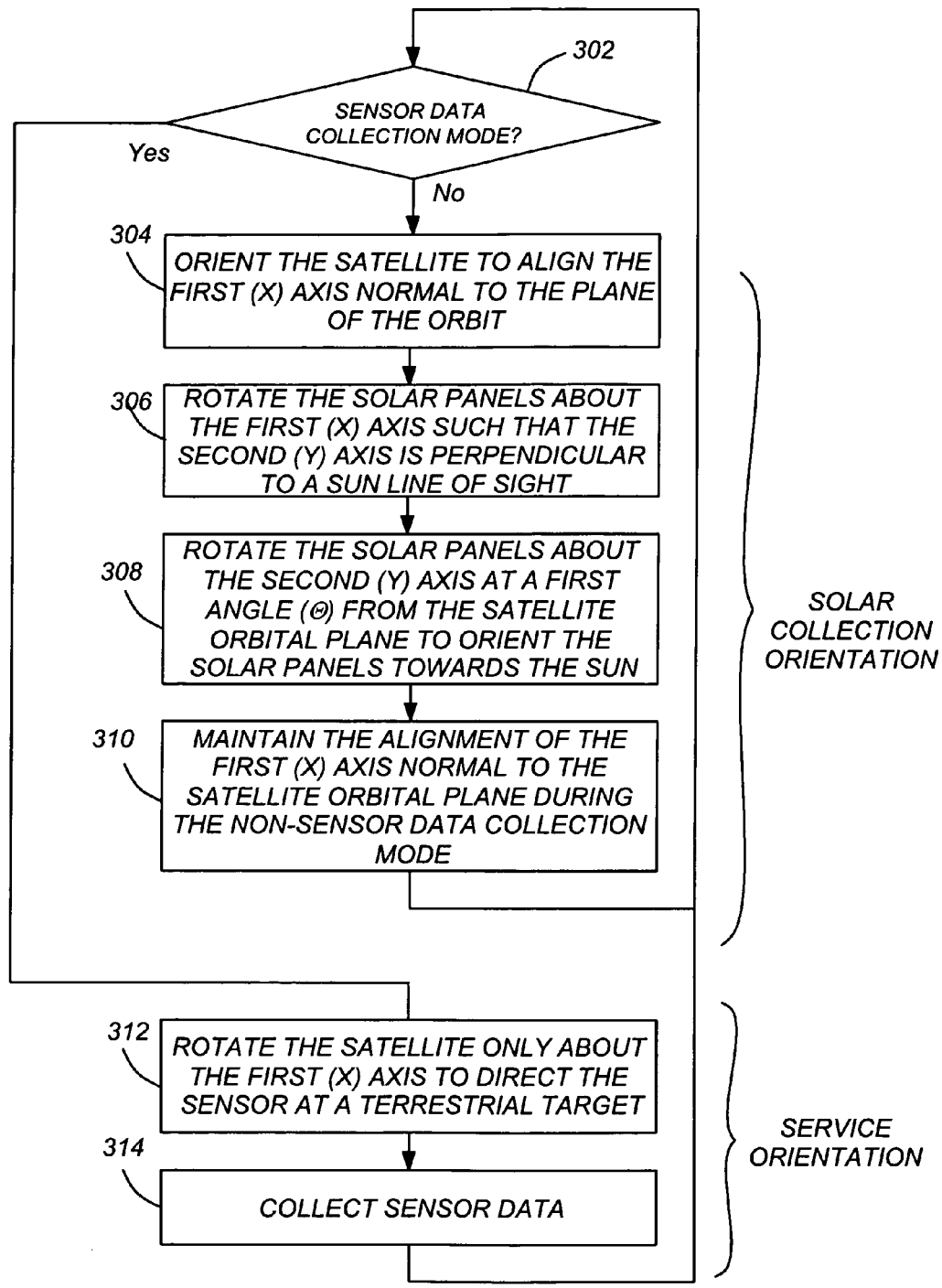
FIG. 3 is a flow chart illustrating representative method steps that can be used to practice one embodiment of the present invention.

FIG. 3 is a diagram presenting illustrative steps that can be used to practice one embodiment of the present invention. The steps described two modes of operation, each associated with an orientation. In a first (solar collection) mode of operation, the satellite 100 is in a solar energy collection orientation, and in the second (data collection) mode of operation, the satellite 100 is in a service orientation wherein the sensor array 112 is directed to obtain data from terrestrial objects.

Figure 4:
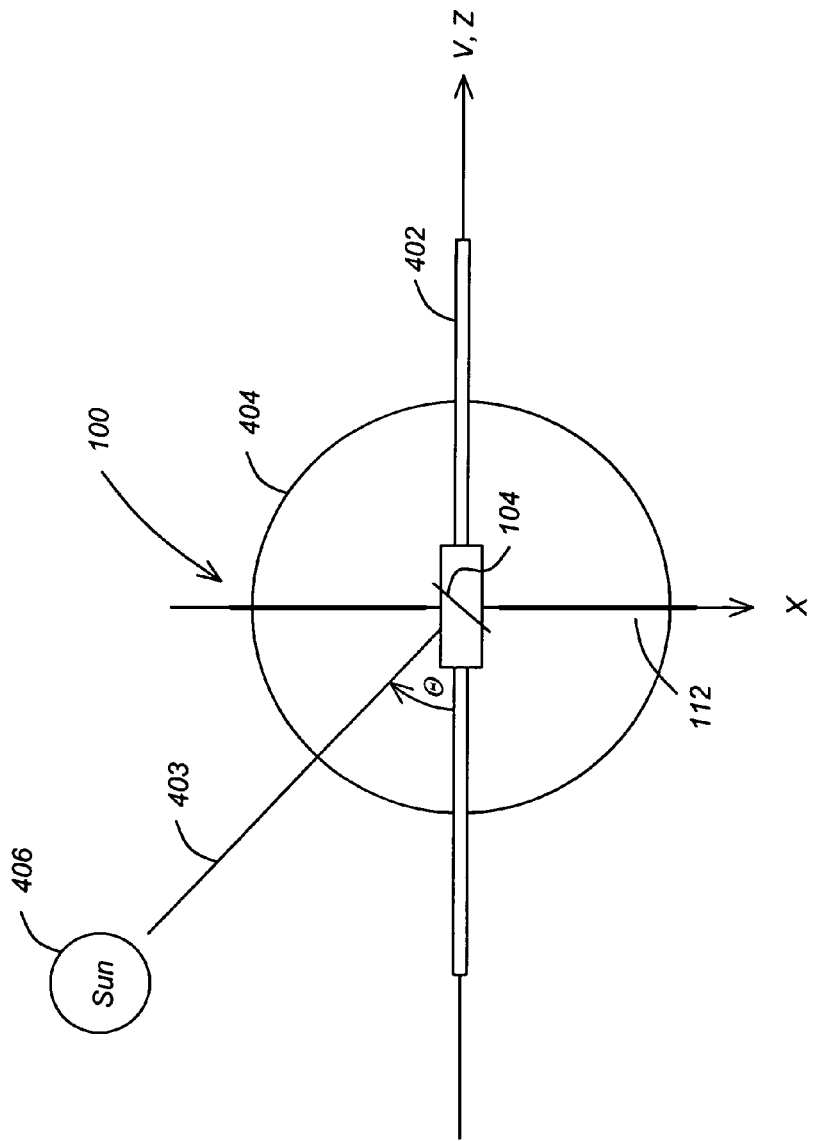
FIG. 4 is a diagram of a satellite in orbit around the Earth in a power charging configuration, viewed edge-on to its orbital plane.
Figure 5:
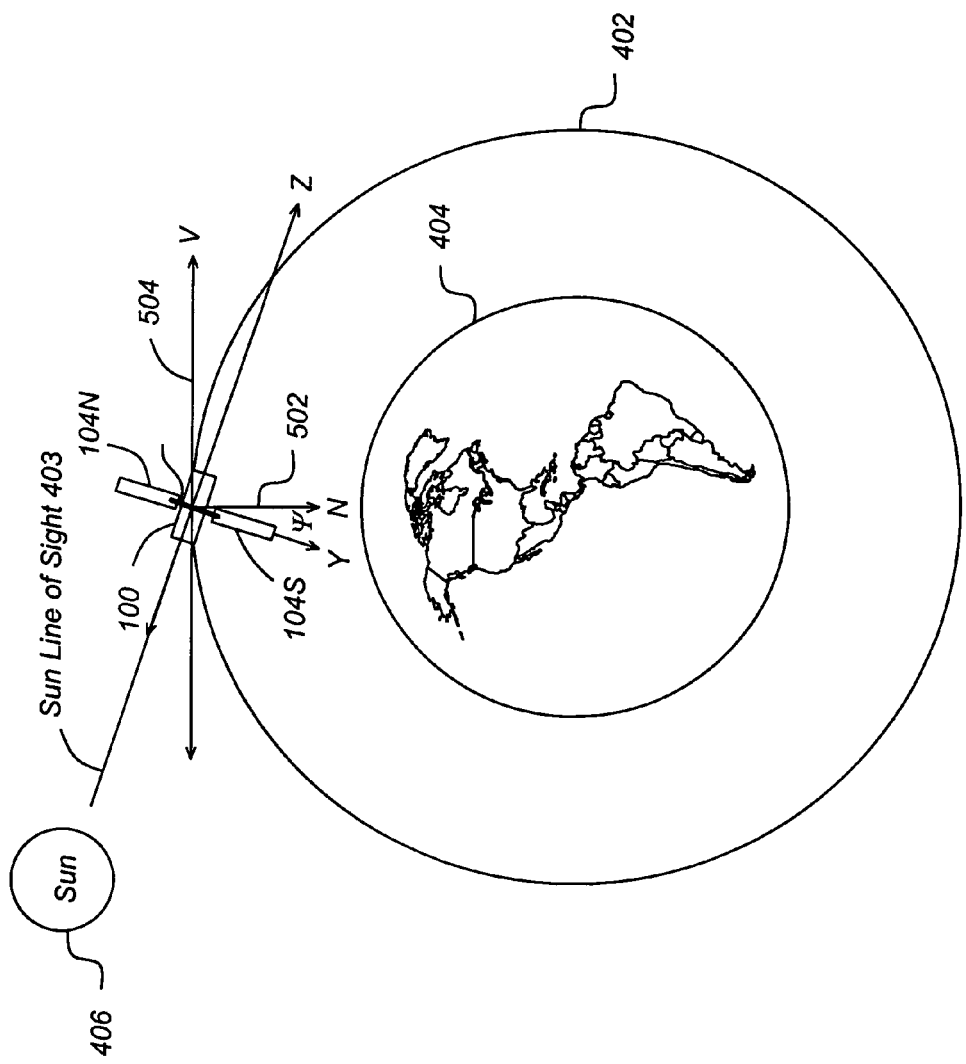
FIG. 5 is a diagram of the satellite shown in FIG. 4, viewed from a location perpendicular to the orbital plane.
Figure 6:
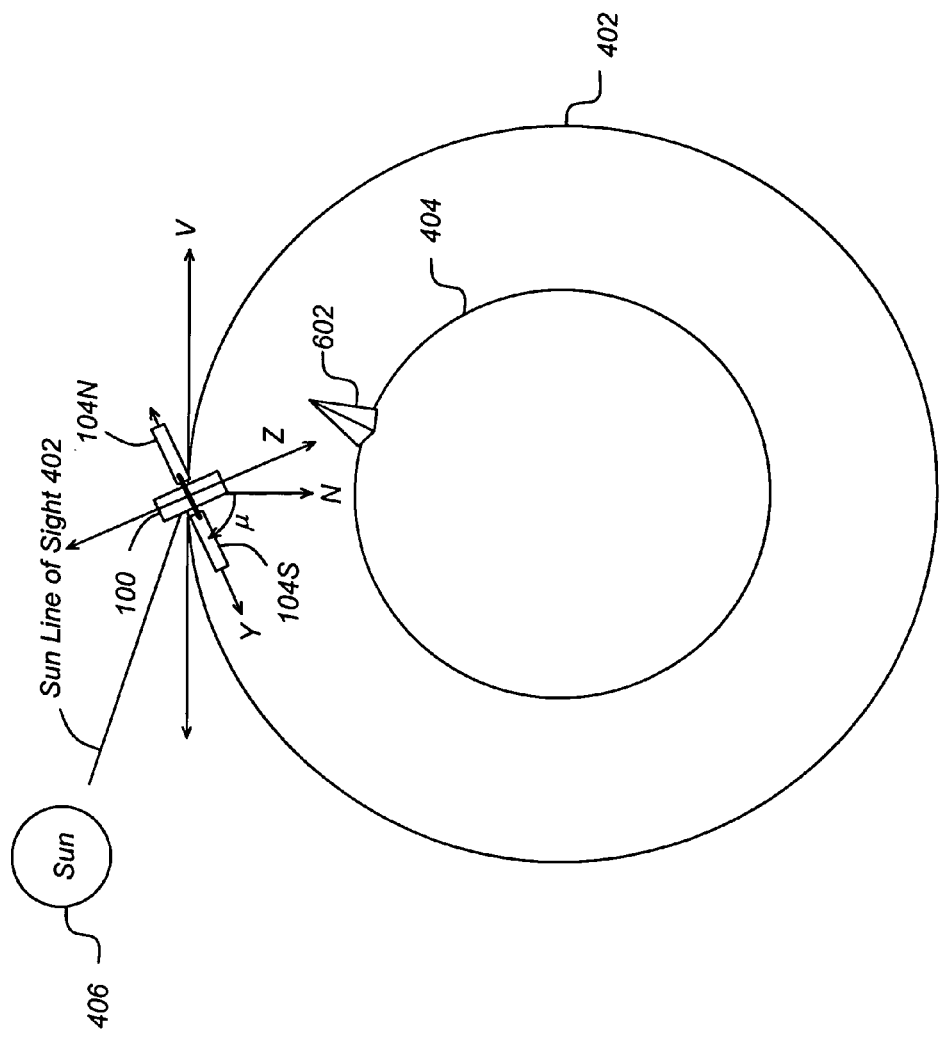
FIG. 6 is a diagram of a satellite in orbit around the Earth in a service orientation, viewed edge-on to the orbital plane.
Figure 7:
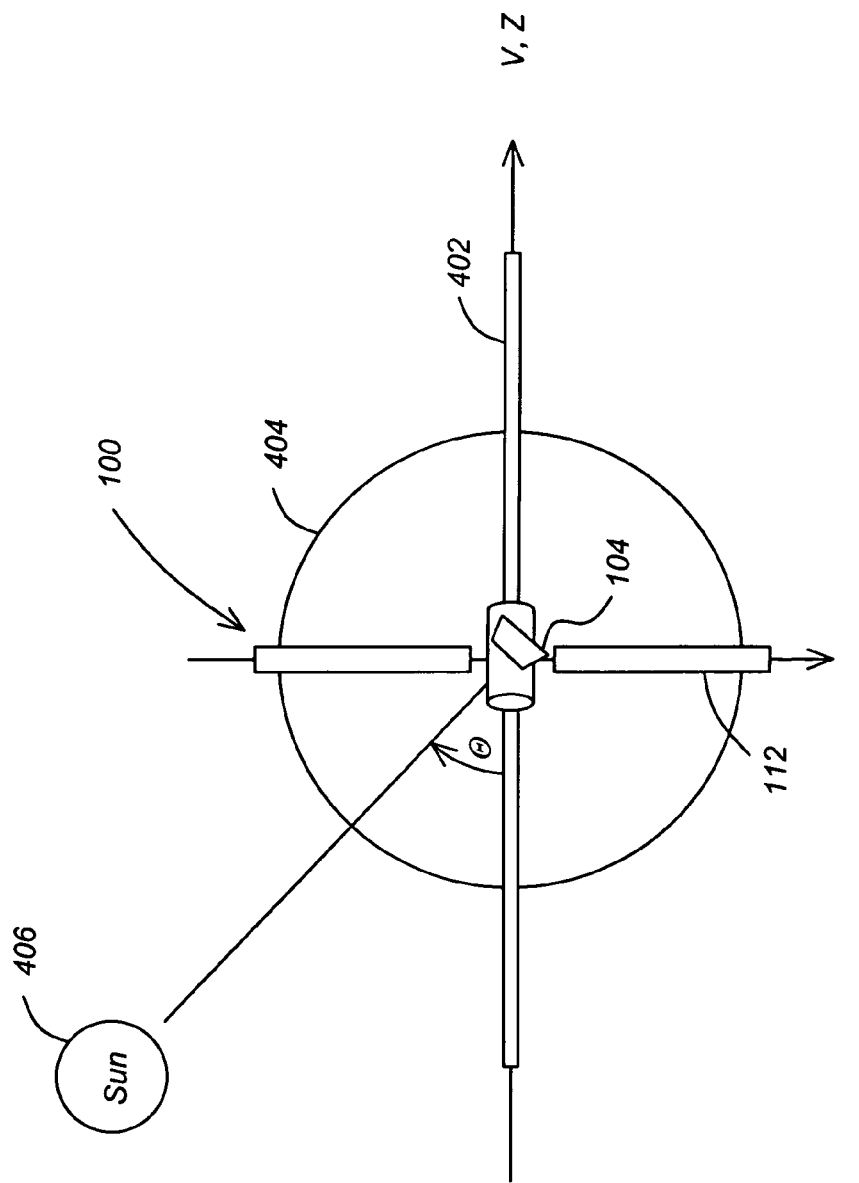
FIG. 7 is a diagram of the satellite shown in FIG. 6, viewed from a location perpendicular to the orbital plane.

FIG. 3 will be discussed in further reference to FIGS. 4-7. FIGS. 4-5 illustrate the satellite 100 in the solar collection mode, while FIGS. 6-7 illustrate the satellite 100 in the data collection mode.

Returning now to FIG. 3, block 302 determines whether the satellite 100 is in the sensor data collection mode. If the satellite 100 is in the data processing mode, logic is routed to block 312, where operations related to sensor data collection mode operations are described.

If the satellite 100 is not in the sensor data collection mode, logic is routed to block 304, where operations related to solar collection are described. If the satellite 100 is not in the data collection mode, the satellite 100 is oriented to align the x axis normal to the plane of the satellite's orbit 402 around the Earth 404, as shown in block 304 and in FIG. 4. In one embodiment, this is accomplished by orienting the satellite 100 to align the x axis to be perpendicular to the Earth nadir (N) 502 and the satellite velocity vector (V) 504.

To direct the solar panels in the direction of the Sun 406, the satellite 100 is rotated about the x axis by an angle $\psi$ so that the y axis is perpendicular to the line of sight to the Sun 403, as shown in block 306 and FIG. 5. In the illustrated embodiment, this is accomplished by rotating the satellite bus 102 about the x axis, but this may be accomplished by rotating the solar panels 104 as well. The solar panels 104 may also rotated about the y axis by an angle $\theta$ from the satellite orbital plane 402, as shown in block 308 and FIG. 4 to further orient the solar panels to be perpendicular to the line of sight to the Sun 406. This can accomplished, for example by using motors or actuators in the satellite bus 102 that rotate the solar panels 104 about the y axis relative to the satellite bus 102.

While in the solar collection mode, the satellite 100 orientation in the solar collection mode is maintained by orienting the satellite to maintain the alignment of the x axis to be normal to the satellite orbital plane, as shown in block 310. This may be accomplished by rotating the x axis of satellite 100 about the same axis and at the same rate as nodal precession of the orbital plane 402. The satellite 100 can also be rotated about the x axis to maintain the surface of the solar panels 104 perpendicular to the Sun line of sight 403. The required rotation rate is approximately the reciprocal of the orbital period of the satellite 100.

If the satellite 100 is in the sensor data collection or service mode, the satellite 100 is rotated only about the first (x) axis to direct the sensitive axis of the sensor array 112 at one or more terrestrial targets 602, as shown in block 312 and illustrated in FIGS. 6 and 7. Sensor data is then collected, as illustrated in block 314. After doing so, the surface of the solar panels 104 will no longer be perpendicular to the Sun line of sight 403, so the amount of solar energy collected by the solar panels will decrease. However, after block 302 determines the required sensor data is collected, the satellite 100 returns to the solar collection mode by following steps 304-310 above.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing was described with respect to a sensor array, the foregoing can be practiced with any payload. Further, although the foregoing is described in terms of being implemented by a processor executing instructions stored in a memory, using the foregoing teaching, it is apparent that the invention may also be implemented by one or more special purpose processors performing subsets of the defined operations, or by hardware dedicated to the tasks.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of maneuvering a satellite in an orbit, the satellite having a payload disposed longitudinally along a first (x) axis and rotatable solar panels disposed longitudinally along a second (y) axis perpendicular to the first axis (x), the satellite having a moment of inertia about the first axis $I_{XX}$ and about the second axis $I_{YY}$ and a moment of inertia $I_{ZZ}$ about a third (z) axis perpendicular to the first axis (x) and the second (y) axis such that $I_{XX}<I_{YY}$ and $I_{XX}<I_{ZZ}$ the method comprising the steps of:

when the satellite is not in a payload data collection mode, performing steps comprising the steps of:
orienting the satellite to align the first (x) axis normal to the plane of the orbit;
rotating the satellite about the first (x) axis such that the second (y) axis is perpendicular to a Sun line of sight;
rotating the solar panels about the second (y) axis at a first angle (θ) from the satellite orbital plane to orient the solar panels towards the Sun; and
maintaining the alignment of the first (x) axis normal to the satellite orbital plane during the non-payload data collection mode;
when the satellite is in a payload data collection mode, performing steps comprising the steps of:
rotating the satellite about only the first (x) axis to direct the payload at a terrestrial target; and
collecting payload data.

2. The method of claim 1, wherein the step of orienting the satellite to align the first (x) axis normal to the plane of the orbit comprises orienting the satellite to align the first axis (x) to be perpendicular to the Earth nadir and a satellite velocity vector.

3. The method of claim 1, wherein the step of maintaining the alignment of the first (x) axis normal to the satellite orbital plane during the non-payload data collection mode comprises the step of rotating the satellite about the first (x) axis to maintain the alignment of the first (x) axis normal to the satellite orbital plane and to direct the second (y) axis perpendicular to the Sun line of sight.

4. The method of claim 1, wherein the step of maintaining the alignment of the first (x) axis normal to the satellite orbital plane during the non-payload data collection mode comprises the step of rotating the first (x) axis about the same axis and at the same rate as a nodal precession of the orbital plane.

5. The method of claim 1, wherein the payload comprises a sensor array longitudinally disposed along the first (x) axis.

6. An apparatus for maneuvering a satellite in an orbit, the satellite having a payload disposed longitudinally along a first (x) axis and rotatable solar panels disposed longitudinally along a second (y) axis perpendicular to the first axis (x), the satellite having a moment of inertia about the first axis $I_{XX}$ and about the second axis $I_{YY}$ and a moment of inertia $I_{ZZ}$ about a third axis (z) perpendicular to the first axis (x) and the second (y) axis such that $I_{XX}<I_{YY}$ and $I_{XX}<I_{ZZ}$, comprising an attitude control system, comprising
a plurality of attitude motive elements, the plurality of attitude motive elements for changing the attitude of the satellite in the first (x) axis, the second (y) axis, and the third (z) axis;
a processor, communicatively coupled to the attitude motive elements, the processor also communicatively coupled to a memory storing instructions comprising instructions for:
when the satellite is not in a payload data collection mode, maneuvering the satellite to a first orientation by orienting the satellite to align the first (x) axis normal to the plane of the orbit, rotating the satellite about the first (x) axis such that the second (y) axis is perpendicular to a Sun line of sight, and rotating the solar panels about the second (y) axis at a first angle (θ) from the satellite orbital plane to orient the solar panels towards the Sun, and maintaining the alignment of the first (x) axis normal to the satellite orbital plane during the non-payload data collection mode; and
when the satellite is in a payload data collection mode, maneuvering the satellite to a second orientation by rotating the satellite only about the first (x) axis to direct the payload at a terrestrial target to collect the payload data.

7. The apparatus of claim 6, wherein the instructions for orienting the satellite to align the first (x) axis normal to the plane of the orbit comprise instructions for orienting the satellite to align the first axis (x) to be perpendicular to the Earth nadir and a satellite velocity vector.

8. The apparatus of claim 6, wherein the instructions for maintaining the alignment of the first (x) axis normal to the satellite orbital plane during the non-payload data collection mode comprises instructions for rotating the satellite about the first (x) axis to maintain the alignment of the first (x) axis normal to the satellite orbital plane and to direct the second (y) axis perpendicular to the Sun line of sight.

9. The apparatus of claim 6, wherein the instructions for maintaining the alignment of the first (x) axis normal to the satellite orbital plane during the non-payload data collection mode comprise instructions for rotating the first (x) axis about the same axis and at the same rate as a nodal precession of the orbital plane.

10. The apparatus of claim 6, wherein the payload comprises a sensor array longitudinally disposed along the first (x) axis.

11. A apparatus for maneuvering a satellite in an orbit, the satellite having a payload disposed longitudinally along a first (x) axis and rotatable solar panels disposed longitudinally along a second (y) axis perpendicular to the first axis (x), the satellite having a moment of inertia about the first axis $I_{XX}$ and about the second axis $I_{YY}$, and a moment of inertia $I_{ZZ}$ about a third axis (z) perpendicular to the first axis (x) and the second (y) axis such that $I_{XX}<I_{YY}$ and $I_{XX}<I_{ZZ}$ the apparatus comprising:

means for orienting the satellite to align the first (x) axis normal to the plane of the orbit, maintaining the alignment of the first (x) axis normal to the satellite orbital plane during the non-payload data collection mode, and rotating the satellite about the first (x) axis such that the second (y) axis is perpendicular to a Sun line of sight, and rotating the solar panels about the second (y) axis at a first angle (θ) from the satellite orbital plane to orient the solar panels towards the Sun when the satellite is not in a payload data collection mode, maneuvering the satellite to a first orientation; and means for rotating the satellite only about the first (x) axis to direct the payload at a terrestrial target and collecting payload data when the satellite is in a payload data collection mode, maneuvering the satellite to a second orientation.

12. The apparatus of claim 11, wherein the means for orienting the satellite to align the first (x) axis normal to the plane of the orbit comprise means for orienting the satellite to align the first axis (x) to be perpendicular to the Earth nadir and a satellite velocity vector.

13. The apparatus of claim 11, wherein the means for maintaining the alignment of the first (x) axis normal to the satellite orbital plane during the non-payload data collection mode comprises means for rotating the satellite about the first (x) axis to maintain the alignment of the first (x) axis normal to the satellite orbital plane and to direct the second (y) axis perpendicular to the Sun line of sight.

14. The apparatus of claim 11, wherein the means for maintaining the alignment of the first (x) axis normal to the satellite orbital plane during the non-payload data collection mode comprises the means for rotating the first (x) axis about the same axis and at the same rate as a nodal precession of the orbital plane.

15. The apparatus of claim 11, wherein the satellite comprises a payload array longitudinally disposed along the first (x) axis.

\* \* \* \* \*